United States Patent [19]

Hughes

[11] Patent Number: 5,276,758
[45] Date of Patent: Jan. 4, 1994

[54] SCALEABLE PHASE-LOCKED SEGMENTED LASER BEAM FREQUENCY SHIFTER

[76] Inventor: John L. Hughes, 6th Floor, 394 Collins St., Melbourne VIC 3000, Australia

[21] Appl. No.: 910,178
[22] PCT Filed: Jan. 16, 1991
[86] PCT No.: PCT/AU91/00014
   § 371 Date: Aug. 17, 1992
   § 102(e) Date: Aug. 17, 1992
[87] PCT Pub. No.: WO91/10937
   PCT Pub. Date: Jul. 25, 1991

[30] Foreign Application Priority Data

Jan. 16, 1990 [AU] Australia ............... PJ8204
Jan. 16, 1990 [AU] Australia ............... PJ8205

[51] Int. Cl.$^5$ ................................. G02B 6/04
[52] U.S. Cl. .................... 385/116; 385/119; 385/122
[58] Field of Search .............. 385/115, 116, 119, 120, 385/122

[56] References Cited

U.S. PATENT DOCUMENTS

| | | | |
|---|---|---|---|
| 4,909,609 | 3/1990 | McDowell | 385/116 |
| 4,983,014 | 1/1991 | Nattermann | 385/115 |
| 5,009,483 | 4/1991 | Rockwell, III | 385/116 |
| 5,022,043 | 6/1991 | Jacobs | 372/95 |
| 5,032,718 | 7/1991 | Murakami | 250/227.20 |

FOREIGN PATENT DOCUMENTS

WO9102993 3/1991 PCT Int'l Appl. .

OTHER PUBLICATIONS

Patent Extracts of Japan, P-12, p. 137, JP, A, 55-003,857, (Mitsubishi Denki K.K) Mar. 18, 1980 (18.03.80), Mutoo et al.

*Primary Examiner*—Frank Gonzalez
*Attorney, Agent, or Firm*—Michael D. Bednarek; Marks & Murase

[57] ABSTRACT

This invention relates to a system for shifting the frequency and wavelength of a laser beam at high efficiency, both pulsed and continuous wave, said system consisting of a hexagonally packed array of optical fibers with non-linear optical cores (1) surrounding by cladding (2) having their end faces (3) optically polished. Input laser beam (4) is split via micro lens array (5) into an array of micro laser beams (6) which matches array of cores (1) where they are frequency converted, said converted beams emerging as micro beam array (7) which is collimated by the second micro lens array (8) into the phase-locked output beam (9).

8 Claims, 3 Drawing Sheets

SCALEABLE PHASE-LOCKED SEGMENTED LASER BEAM FREQUENCY SHIFTER

FIELD OF THE INVENTION

This invention relates to a system for shifting the frequency and wavelength of a laser beam consisting of a scaleable, phase-locked array of non-linear optical fibers each of the said fibers being embedded in an optically transparent medium, which, collectively form a coherently packed bundle, with the opposite faces of said bundle formed by the ends of said fibers, being optically polished, with a micro lens array positioned near to each of the said optically polished faces such that a laser beam incident on one of the micro lens array is split into an array of focussed micro laser beams each one of which matches into a particular optical fiber in the array of said fibers forming the said invention. On being focussed into said fibers within said fiber bundle of said system, the laser light propagating through said fibers is partially frequency shifted to a frequency which depends on the properties of said non-linear optical medium forming said fiber cores and on the frequency of the input laser beam propagating through the said system.

The invention has application for the frequency and wavelength shifting of laser beams used in materials processing, medical, research, defence applications and isotope separation.

SUMMARY OF THE PRIOR ART

Prior art laser beam frequency shifting systems consisted either of a single crystal block of non-linear optical media or a single optical fiber whose core consisted of a non-linear optical medium.

These prior art frequency shifting systems were ineffective in providing scaleable output power under continuous wave operation which demands that the laser beam intensities within the non-linear optical medium be very high, exceeding about 100,000 watts per square centimeter, power levels which would melt known bulk media at such high beam intensities.

Prior art frequency shifting systems which utilised single fiber cores did achieve high beam intensities over extended lengths, a process which led to the efficient conversion (over 50%) of the primary laser beam propagating through said non-linear fiber, but at very low power levels of only a few milliwatts.

The present invention overcomes the defects of prior art frequency and wavelength shifting systems in that it provides high beam intensities within a phase-locked array of fibers of non-linear media so that scaleable laser beams of high, continuous wave power is achieved for the first time.

The present invention also differs from the frequency shifters of the prior art because it utilises a phase-locked array of laser beams whose relative phases can be varied to produce scannable output beams at the shifted frequency.

BACKGROUND OF THE INVENTION

As scaleable, high power, continuous wave lasers have become available, their available wavelengths have tended to be in the near and mid infra-red regions of the electro-magnetic spectrum rather than in the visible and ultra violet regions where an increasing number of applications are emerging.

In order effectively shift the infra-red laser wavelengths into the visible and ultra violet regions under continuous wave conditions, it is necessary to pass the said infra-red laser beams at high intensities over relatively long lengths of non-linear optical media. This requirement eliminates the use of bulky non-linear crystals, which are effective under pulsed conditions, because the enormous laser beam intensities would heat up the crystal, initially causing thermally induced self-focussing effects and finally simply destroying the said bulk crystal.

It was known since the early 1960s that laser beams traversing the cores of multimode optical fibers gave rise to very high flux densities of many hundreds of watts per square centimeter. With the subsequent advent of single mode fibers, it was possible to inject a laser beam into a core only a few microns in diameter, that is, with a cross-sectional area of less than a millionth of a square centimeter so that less than a watt of continuous wave power was needed to achieve the enormous laser beam intensities exceeding one megawatt per centimeter square. Furthermore, with what is essentially a laser beam of merely one wavelength diameter traversing the core of the single mode fiber, it was not possible for self-focussing effects to occur and the heat dissipated per unit length of the fiber core was found to be negligible compared to the heating effects in bulk materials of similar thermal conductivity. It was eventually observed that, at the high laser beam intensities which could be maintained in single mode optical fiber cores, (normally a glass medium with linear optical properties), the fiber cores could become a non-linear frequency shifting medium for the transmitted laser beam. On the other hand, with fiber cores formed from non-linear optical material it became possible to convert over fifty percent of the propagating primary laser beam into its harmonics in the said fiber cores. However, once out of the fiber core, the laser beam expanded at angles of thirty degrees or more so that their intensities became very small as well as their total power which in general would be less than one tenth of a watt for continuous waves.

The present invention provides for the generation of scaleable power, frequency shifted laser beams which are phase-locked together to form what is essentially a single laser beam. In other words, if one inserts the invention into a given laser beam, then its frequency shifted component will be produced along the propagation path of the primary beam or at the appropriate angle to said primary beam if the relative phases of the primary beam are adjusted.

The invention can take the form of a bundle of single mode optical fibers with the appropriate non-linear cores or a solid block drilled with an array of holes into which non-linear fiber cores are inserted. Fluid cooling of the matrix medium can be used to maintain equal path lengths over the several centimeters of non-linear fiber cores required to achieve efficient conversion of continuous wave laser beam frequency. The invention can be positioned between two reflecting mirrors appropriately mirrored to generate standing waves within the said non-linear fiber cores. The invention can also be operated under pulsed as well as continuous wave conditions.

SUMMARY OF THE INVENTION

It is an object of the invention to provide a scaleable system for shifting the frequency and wavelengths of scalable power laser beams so as to achieve high conversion efficiencies under both pulsed and continuous wave operation without damaging the non-linear optical medium in which the said frequency and wavelength shifting takes place.

Another object of the system is to provide for the phase-locking of the laser beams so that the frequency shifted output beam consists of a large number of phase-locked micro laser beams which are effectively combined into a single beam comparable in dimensions to that of the primary input beam.

It is an object of the invention to split the primary input laser beam whose frequency is to be shifted into an array of focussed micro beams, each of which matches the cores of an array of non-linear optical fibers so that each of the said micro beams propagates along its matching fiber cores at intensities and over lengths of said fiber so as to provide for efficient frequency shifting, said frequency shifted laser micro beam emerging through the optically polished end face of the said fiber core so that it is phase-locked with its neighbouring micro beams which are then collimated via a second micro lens array to emerge as a single, phase-locked, frequency shifted laser beam.

Another object of the invention is to provide a reflecting mirror at both ends to generate standing waves of both the primary and frequency shifted laser beams within the cores of said single mode fibers.

It is also an object of the invention to transmit and frequency shift laser beams whose phases are adjusted such that the output frequency shifted beam is scanned relative to the axis of the input beam.

Another object of the invention is to provide cooling channels so that said system can be maintained at an optical path length consistent with good phase-locking at elevated power levels.

BRIEF DESCRIPTION OF THE DRAWINGS

A better understanding of the invention may be obtained from the following considerations taken in conjunction with the accompanying drawings which are not meant to limit the scope of the invention in any way.

DETAILED DESCRIPTION OF THE INVENTION

Figure 1:
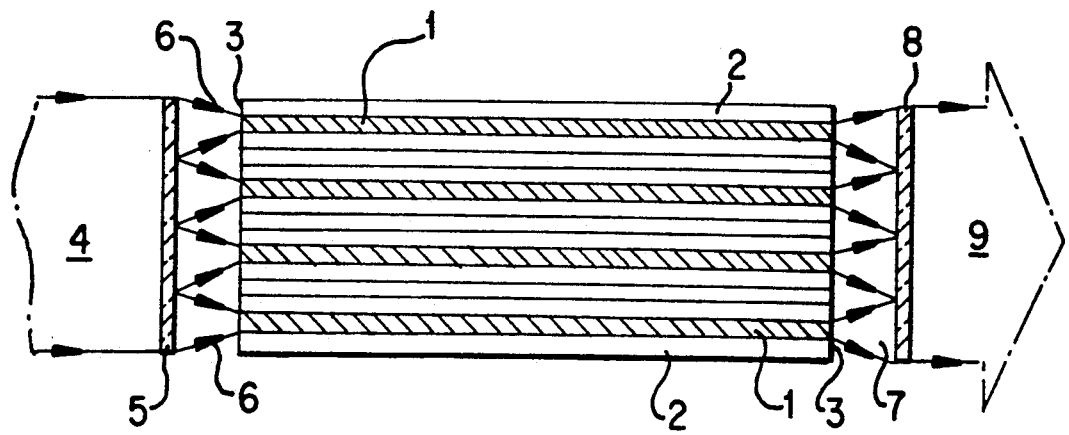
FIG. 1 shows a cross-section of the invention with the input laser beam being split into an array of focussed micro laser beams with a micro lens array so that they are matched into an array of non-linear optical fibers the frequency shifted output of which is collimated by a second array of micro lenses into a single, phase-locked, frequency shifted laser beam.

In FIG. 1, numeral 1 indicates the non-linear optical medium in the form of a single mode optical fiber core whose cladding is indicated by numeral 2. Numeral 3 indicates the optically polished and anti-reflection coated end faces of the non-linear optical fiber formed by non-linear core 1 and its cladding 2. Numeral 4 indicates the input laser beam which is split into an array of focussed micro beams using the micro lens array indicated by numeral 5. The focussed micro laser beams indicated by numeral 6 enter non-linear medium 1 so that their intensity is increased to several megawatts per square centimeter at which level a portion of the said laser beam is frequency shifted in a manner characteristic of non-linear medium 1 and the fundamental frequency of the incoming laser beam. The frequency shifted (and non frequency shifted) portion of the said laser beam emerge from the exit face of the said fiber array as the diverging micro laser beam array indicated by numeral 7 to be collimated by the micro lens array indicated by numeral 8 into the phase-locked output beam indicated by numeral 9.

Figure 2:
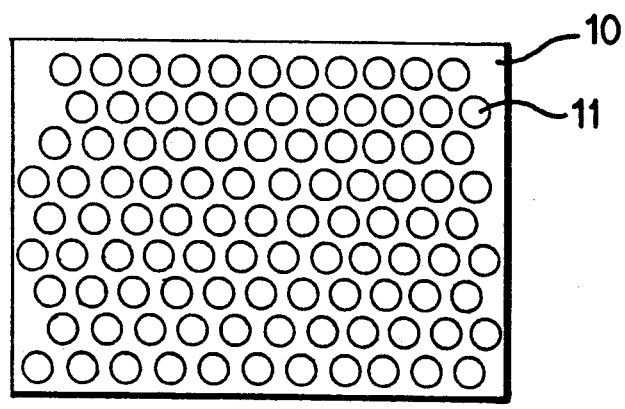
FIG. 2 shows the array of non-linear optical fibers contained within a block of optically transparent material at the laser beam wavelength.

In FIG. 2, numeral 10 indicates the cross-section of a block containing an array of the non-linear optical media 11.

Figure 3:
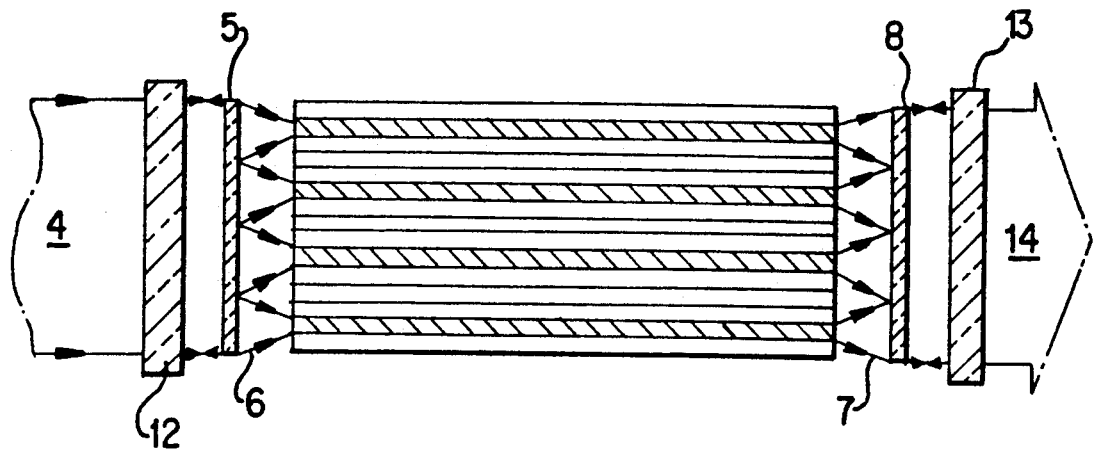
FIG. 3 shows the invention inserted between two laser mirrors to form and optical parametric oscillator.

In FIG. 3, numeral 12 indicates a laser mirror which is fully transparent to the input laser beam indicated by numeral 4 but fully reflecting the frequency shifted laser beam generated by the invention. Numeral 7 indicates an array of diverging micro laser beams which are collimated via micro lens array indicated by numeral 8 into a parallel, phase-locked laser beam which is partially reflected by the mirror indicated by numeral 13 into a phase-locked output beam at the shifted wavelength indicated by numeral 14.

Figure 4:
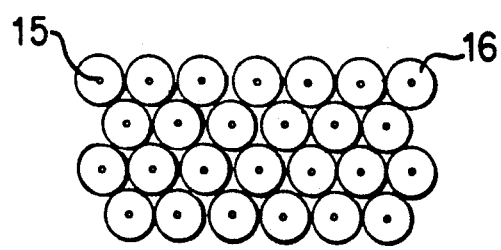
FIG. 4 shows the packing of the non-linear fibers in a hexagonal format resulting in the cores of the said fibers being equidistant from each other with their core diameter being much less than the thickness of their cladding.

In FIG. 4, numeral 15 indicates the non-linear medium with a core diameter smaller than the cladding thickness indicated by numeral 16.

Figure 5:
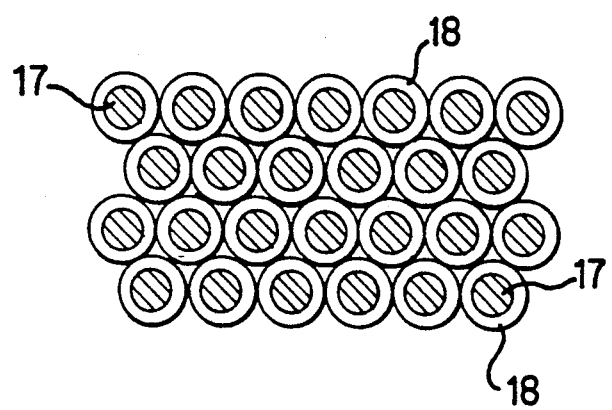
FIG. 5 shows the non-linear optical fibers in a hexagonally packed array with their core diameters greater than their separation.

In FIG. 5, numeral 17 indicates the non-linear medium with a core diameter larger than the cladding thickness indicated by numeral 18.

I claim,

1. A scaleable system for shifting the frequency and wavelength of a pulsed and continuous laser beam at high efficiencies, said system consisting of:
   (a) a bundled, hexagonally packed array of single mode, optical fibers with non-linear optical cores, said fiber bundle having both of its end faces optically polished and anti-reflection coated to minimise optical losses, the spacing between the said fibers within said bundles being used as cooling channels,
   (b) a micro lens array to split up the input beam into an array of focussed micro laser beams such that each of the said micro laser beams matches a particular fiber core in the said fiber bundle array,
   (c) a micro lens array which combines the array of frequency shifted micro laser beams emerging from the exit face of said fiber bundle so that they are collimated into a single phase-locked laser beam at the shifted frequency.

2. A system as claimed in claim 1, inserted between two mirrors, the first of the said mirrors being fully reflecting at the frequency shifted wavelength and fully transmitting at the input laser beam frequency whilst the second mirror, positioned near the output end of said system, is fully reflecting at the input laser beam frequency and partially reflecting at the shifted frequency of the output beam.

3. A system as claimed in claim 1 which can be scaled by adding more fibers to said fiber bundle and enlarging the matching micro lens arrays.

4. A system as claimed in claim 2 which can be scaled by adding more fibers to said fiber bundle and enlarging the matching micro lens arrays and mirrors.

5. A scaleable system for shifting the frequency and wavelength of a pulsed and continuous laser beam at high efficiencies, said system consisting of:
   (a) a solid block of material with its opposite end faces being optically polished, said block being drilled to form a parallel array of holes between said end faces into which are inserted fibers, with optically polished ends, of non-linear optical material to form a close packed array of said fibers,
   (b) a micro lens array to split up the input beam into an array of focussed micro laser beams such that each of the said micro laser beams matches a particular fiber core in the said block,
   (c) a micro lens array which combines the array of frequency shifted micro laser beams emerging from the exit face of said block so that they can be collimated into a single, phase-locked laser beam at their shifted frequency.

6. A system as claimed in claim 5, inserted between two mirrors, the first of the said mirrors being fully reflecting at the frequency shifted wavelength and fully transmitting at the input laser beam frequency whilst the second mirror, positioned near the output end of the said system, is fully reflecting at the input laser beam frequency and partially reflecting at the shifted frequency of the output beam.

7. A system as claimed in claim 5 which can be scaled by drilling more holes in said block and enlarging its size allowing for the insertion of more of the said fibers in the process, whilst allowing from the enlargement of the matching micro lens arrays in the process.

8. A system as claimed in claims 1 and 5 in which the micro laser beams propogating through said fiber cores have their phase delayed with respect to each other so that their output beams are scanned relative to the direction of propogation of the input beam.

* * * * *